(12) United States Patent
Kang et al.

(10) Patent No.: US 11,695,154 B2
(45) Date of Patent: Jul. 4, 2023

(54) ELECTROLYTE CONTAINING SILOXANE COMPOUND AND LITHIUM SECONDARY BATTERY INCLUDING THE ELECTROLYTE

(71) Applicants: Samsung Electronics Co., Ltd., Suwon-si (KR); Samsung SDI Co., Ltd., Yongin-si (KR)

(72) Inventors: Yoonsok Kang, Seongnam-si (KR); Myongchun Koh, Hwaseong-si (KR); Jihyun Jang, Yongin-si (KR); Insun Park, Suwon-si (KR); Jinah Seo, Seoul (KR); Yeonji Chung, Yongin-si (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 489 days.

(21) Appl. No.: 16/722,114

(22) Filed: Dec. 20, 2019

(65) Prior Publication Data
US 2020/0220218 A1 Jul. 9, 2020

(30) Foreign Application Priority Data
Jan. 3, 2019 (KR) .......................... 10-2019-0000864

(51) Int. Cl.
*H01M 10/0525* (2010.01)
*H01M 10/0567* (2010.01)
(Continued)

(52) U.S. Cl.
CPC ....... *H01M 10/0567* (2013.01); *C07F 7/0836* (2013.01); *H01M 10/0525* (2013.01);
(Continued)

(58) Field of Classification Search
CPC ......... H01M 10/0525; H01M 10/0567; H01M 10/0568; H01M 10/0569; H01M 2300/0028
See application file for complete search history.

(56) References Cited

U.S. PATENT DOCUMENTS

| 6,124,062 A | 9/2000 | Horie et al. |
| 8,796,406 B2 | 8/2014 | Gupta et al. |

(Continued)

FOREIGN PATENT DOCUMENTS

| JP | 1999273732 A | 10/1999 |
| JP | 200058123 A | 2/2000 |

(Continued)

OTHER PUBLICATIONS

Kim et al., "Improvement of lithium-ion battery performance at low temperature by adopting polydimethylsiloxane-based electrolyte additives", Electrochimica Acta, 136, 2014, 182-188.

(Continued)

*Primary Examiner* — Osei K Amponsah
(74) *Attorney, Agent, or Firm* — Cantor Colburn LLP

(57) ABSTRACT

An electrolyte and a lithium secondary battery including the same. The electrolyte includes a lithium salt; an organic solvent; and at least one siloxane compound represented by Formula 1 or Formula 2, wherein an amount of the at least one siloxane compound is about 0.05 wt % to about 20 wt % based on a total weight of the electrolyte.

Formula 1

(Continued)

-continued

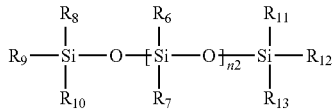

Formula 2

In Formulae 1 and 2, group substituents and number indices are as defined in the specification.

20 Claims, 6 Drawing Sheets

(51) Int. Cl.
*H01M 10/0568* (2010.01)
*C07F 7/08* (2006.01)
*H01M 10/0569* (2010.01)

(52) U.S. Cl.
CPC ... *H01M 10/0568* (2013.01); *H01M 10/0569* (2013.01); *H01M 2300/0028* (2013.01)

(56) References Cited

U.S. PATENT DOCUMENTS

| | | | |
|---|---|---|---|
| 2005/0106470 | A1 | 5/2005 | Yoon et al. |
| 2011/0076572 | A1 | 3/2011 | Amine et al. |
| 2015/0118580 | A1* | 4/2015 | Kondo .............. H01M 10/0525 429/324 |
| 2018/0138548 | A1 | 5/2018 | Buisine |

FOREIGN PATENT DOCUMENTS

| | | |
|---|---|---|
| JP | 2005190880 A | 7/2005 |
| KR | 1020140066163 A | 5/2014 |
| KR | 1020170139051 A | 12/2017 |

OTHER PUBLICATIONS

Nakahara et al., "Effect of an additive to polysiloxane-based electrolyte on passive film formation on a graphite electrode", Journal of Power Sources, 158, 2006, 600-607.

Orikasa et al., "Ionic Conduction in Lithium Ion Battery Composite Electrode Governs Cross-sectional Reaction Distribution", Scientific Reports, Nature, 2016, p. 1-6.

Rossi et al., "Synthesis and Characterization of Tetra-and Trisiloxane-Containing Oligo(ethylene glycol)s—Highly Conducting Electrolytes for Lithium Batteries", Chem. Mater. 18, 2006, 1289-1295.

\* cited by examiner

ELECTROLYTE CONTAINING SILOXANE COMPOUND AND LITHIUM SECONDARY BATTERY INCLUDING THE ELECTROLYTE

CROSS-REFERENCE TO RELATED APPLICATION

This application claims priority to and the benefit of Korean Patent Application No. 10-2019-0000864, filed on Jan. 3, 2019, in the Korean Intellectual Property Office, and all the benefits accruing therefrom under 35 U.S.C. § 119, the content of which is incorporated herein in its entirety by reference.

BACKGROUND

1. Field

The present disclosure relates to an electrolyte containing a siloxane compound, and a lithium secondary battery including the siloxane compound-containing electrolyte.

2. Description of the Related Art

Lithium batteries may be used as power sources for portable electronic devices, such as video cameras, mobile phones, laptop computers, and the like. Rechargeable lithium batteries, i.e., lithium secondary batteries, may have an specific energy that is three or more times greater than that of lead storage batteries, nickel-cadmium batteries, nickel-hydrogen batteries, nickel-zinc batteries, and the like, Another potential technical advantage is that lithium batteries may be rapidly charged.

To develop lithium secondary batteries which provide improved specific energy, various methods for implementing high capacity have been studied. One of the methods for implementing high capacity is using a thick electrode having a high current density and a thick electrode mixture layer. This method may increase capacity and energy density; however, due to the thickening of the electrode, the thickness may deteriorate impregnability of an electrolyte to the electrode and mobility of lithium ions. In addition, the thicker the electrode, the larger the electrical resistance or the ionic resistance, and the poorer the rate properties may become. Accordingly, lifetime characteristics and low-temperature characteristics of the lithium battery may be deteriorated.

Therefore, there is a need for a method of improving both the impregnability of an electrolyte into a thick electrode and the mobility of lithium ions, to thereby improve rate properties and lifetime characteristics of a lithium secondary battery including the electrolyte.

SUMMARY

Provided is an electrolyte for a lithium secondary battery, the electrolyte including a siloxane compound.

Provided is a lithium secondary battery including the electrolyte.

According to an aspect of an embodiment, an electrolyte includes: a lithium salt; an organic solvent; and at least one siloxane compound represented by Formula 1, or Formula 2, wherein an amount of the at least one siloxane compound of Formulae 1 or 2 is about 0.05 weight percent (wt %) to about 20 wt %, based on a total weight of the electrolyte

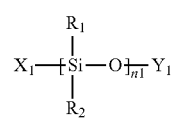

Formula 1

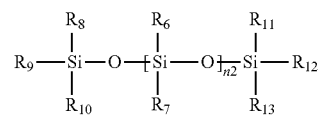

Formula 2 wherein, in Formulae 1 and 2,
$X_1$ is hydrogen, a hydroxyl group, or a substituted or unsubstituted $C_1$-$C_{10}$ alkyl group,
$Y_1$ is hydrogen or —Si($R_3$)($R_4$)($R_5$),
n1 is an integer from 1 to 1000,
n2 is an integer from 1 to 5, and
$R_1$ to $R_{13}$ are each independently hydrogen, a substituted or unsubstituted $C_1$-$C_{10}$ alkyl group, a substituted or unsubstituted $C_6$-$C_{20}$ aryl group, or a polyalkylene oxide group represented by *—$R_{31}$—O—(RO)$_{m2}$—$R_{32}$, wherein $R_{31}$ is a single bond that connects O to Si and * is a point of attachment, or a substituted or unsubstituted $C_1$-$C_{10}$ alkylene group, RO is an alkylene oxide group, m2 is an integer from 1 to 20, and $R_{32}$ is hydrogen or a substituted or unsubstituted $C_1$-$C_{10}$ alkyl group,
wherein, in Formula 1, $X_1$ is a hydroxyl group or $Y_1$ is hydrogen, and in Formula 2, at least one of $R_6$ to $R_{13}$ is the polyalkylene oxide group.

According to an aspect, a lithium secondary battery includes: a cathode containing a cathode active material; an anode containing an anode active material; and the electrolyte disposed between the cathode and the anode.

Also disclosed is a method of manufacturing a lithium secondary battery, the method including: providing a cathode, an anode, and a separator; disposing the separator between the cathode and the anode; and contacting the cathode, the anode, and the separator with the electrolyte of claim 1 to manufacture the battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
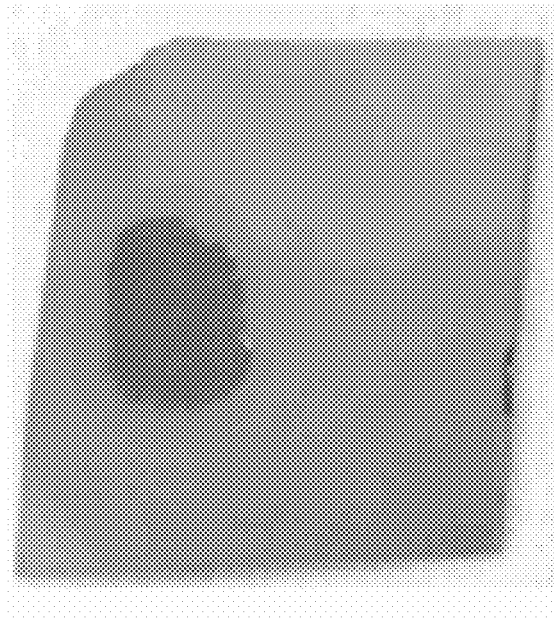
FIGS. 1A to 1D are images illustrating results of evaluation of impregnability and wettability of each of electrolytes prepared in Preparation Example 1 and Comparative Preparation Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of at least one of the associated listed items. Expressions such as "at least one of," when preceding a list of elements, modify the entire list of elements and do not modify the individual elements of the list.

Hereinafter, embodiments of an electrolyte, and a lithium secondary battery including the electrolyte according to any of the embodiments will be described in greater detail.

According to an aspect of the disclosure, an electrolyte includes a lithium salt, an organic solvent, and at least one siloxane compound represented by Formula 1 or Formula 2, wherein an amount of the at least one siloxane compound is about 0.05 wt % to about 20 wt % based on a total weight of the electrolyte:

$$X_1 \!-\!\!\left[\!\!\begin{array}{c} R_1 \\ | \\ Si\!-\!O \\ | \\ R_2 \end{array}\!\!\right]_{\!n1}\!\!Y_1 \qquad \text{Formula 1}$$

$$R_9\!-\!\!\begin{array}{c} R_8 \\ | \\ Si\!-\!O \\ | \\ R_{10} \end{array}\!\!\left[\!\!\begin{array}{c} R_6 \\ | \\ Si\!-\!O \\ | \\ R_7 \end{array}\!\!\right]_{\!n2}\!\!\begin{array}{c} R_{11} \\ | \\ Si\!-\!R_{12} \\ | \\ R_{13} \end{array} \qquad \text{Formula 2}$$

wherein, in Formulae 1 or 2, $X_1$ is hydrogen, a hydroxyl group, or a substituted or unsubstituted $C_1$-$C_{10}$ alkyl group, $Y_1$ is hydrogen or —$Si(R_3)(R_4)(R_5)$, n1 is an integer from 1 to 1000, n2 is an integer from 1 to 5, and $R_1$ to $R_{13}$ are each independently hydrogen, a substituted or unsubstituted $C_1$-$C_{10}$ alkyl group, a substituted or unsubstituted $C_6$-$C_{20}$ aryl group, or a polyalkylene oxide group represented by *—$R_{31}$—O—$(RO)_{m2}$—$R_{32}$, wherein $R_{31}$ is a single bond that connects O to Si and * is a point of attachment, or a substituted or unsubstituted $C_1$-$C_{10}$ alkylene group, RO is an alkylene oxide group, m2 is an integer from 1 to 20, and $R_{32}$ is hydrogen or a substituted or unsubstituted $C_1$-$C_{10}$ alkyl group, wherein, in Formula 1, $X_1$ is a hydroxyl group, or $Y_1$ hydrogen, and in Formula 2, at least one of $R_6$ to $R_{13}$ is the polyalkylene oxide group.

While not wanting to be bound by theory, it is understood that the siloxane compound having a low surface tension may lower interfacial resistance of the electrolyte in a lithium secondary battery. It is understood that the reduced surface tension improves the impregnability of the electrolyte into a thick electrode and improves mobility of lithium ions.

Accordingly, gas generation caused by side reactions may be suppressed in a lithium secondary battery including the electrolyte, and lifetime characteristics of the battery may be improved.

In Formula 1, $X_1$ may be a hydroxyl group, or $Y_1$ may be hydrogen. When the siloxane compound represented by Formula 1 includes such a hydroxyl terminal group, the electrolyte including the siloxane compound may have improved interfacial characteristics and improved impregnability into a thick electrode, e.g., vertical-direction permeation property into a thick electrode, impregnation in a direction orthogonal to a current collector, e.g., from a surface of the electrode adjacent a separator to a surface of the electrode adjacent a current collector.

For example, the siloxane compound represented by Formula 1 may be a compound represented by Formula 1A.

$$HO\!-\!\!\left[\!\!\begin{array}{c} R_{21} \\ | \\ Si\!-\!O \\ | \\ R_{22} \end{array}\!\!\right]_{\!n1}\!\!H \qquad \text{Formula 1A}$$

In Formula 1A, n1 is an integer from 1 to 1000, and $R_{21}$ and $R_{22}$ are each independently hydrogen or a substituted or unsubstituted $C_1$-$C_{10}$ alkyl group.

For example, the siloxane compound represented by Formula 1 may be a compound represented by Formula 1B.

$$HO\!-\!\!\left[\!\!\begin{array}{c} CH_3 \\ | \\ Si\!-\!O \\ | \\ CH_3 \end{array}\!\!\right]_{\!n1}\!\!H \qquad \text{Formula 1B}$$

In Formula 1B, n1 may be an integer from 1 to 1000.

For example, the polyalkylene oxide group may be a group represented by Formula 3.

$$*\!-\!\!(CH_2)_{m1}\!-\!O\!-\!\!\left[\!\!\begin{array}{c} \\ \\ R_{33} \end{array}\!\!\right.\!\!\!O\!\!\left.\!\!\begin{array}{c} \\ \\ \end{array}\!\!\right]_{\!m2}\!\!R_{32} \qquad \text{Formula 3}$$

In Formula 3, m1 is an integer from 0 to 5, m2 is an integer from 1 to 20, and $R_{32}$ and $R_{33}$ are each independently hydrogen or a substituted or unsubstituted $C_1$-$C_{10}$ alkyl group, and * represents a point of attachment to Si.

For example, in Formula 3, $R_{32}$ and $R_{33}$ are each independently hydrogen or a methyl group.

For example, when m2 in Formula 3 is 2 or greater, at least two units represented by *—[$CH_2$—$CH(R_{33})$—O]—* may be identical to or different from each other.

In an embodiment, the polyalkylene oxide group may be a group represented by Formula 4.

$$*\!-\!\!(CH_2)_{m1}\!-\!O\!\!\left[\!\!\begin{array}{c} \\ \\ \end{array}\!\!O\!\!\right]_{\!m3}\!\!\left[\!\!\begin{array}{c} \\ \\ \end{array}\!\!O\!\!\right]_{\!m4}\!\!R_{32} \qquad \text{Formula 4}$$

In Formula 4, m1 is an integer from 0 to 5, m3 and m4 are each independently an integer from 0 to 10, wherein the sum of m3 and m4 is 1 or greater, $R_{32}$ is hydrogen or a methyl group, and * represents a point of attachment to Si.

In an embodiment, the siloxane compound represented by Formula 2 may be represented by Formula 2A or 2B.

Formula 2A

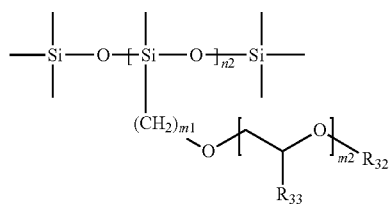

Formula 2B

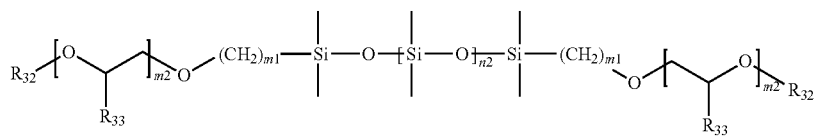

In Formulae 2A and 2B, n2 is an integer from 1 to 5, m1 is an integer from 0 to 5, m2 is an integer from 1 to 20, and $R_{32}$ and $R_{33}$ are each independently hydrogen or a methyl group.

For example, in Formulae 2A and 2B, n2 is 1. In another example, in Formulae 2A and 2B, n2 is 2 or 3.

The siloxane compound represented by Formula 2 may be a compound represented by one of Formulae 2C to 2I.

Formula 2C

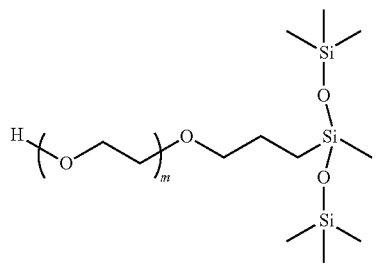

Formula 2D

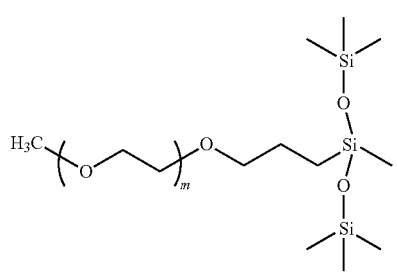

Formula 2E

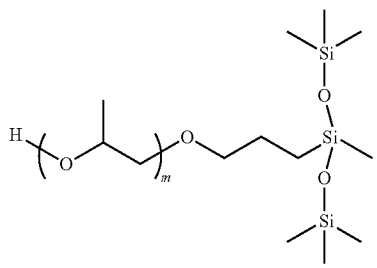

Formula 2F

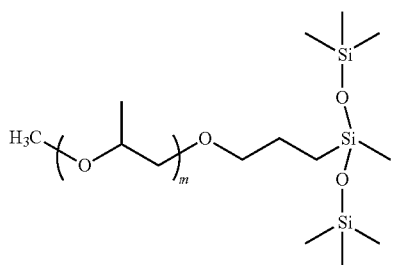

Formula 2G

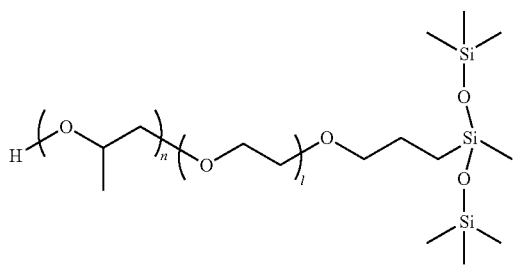

Formula 2H

Formula 2I

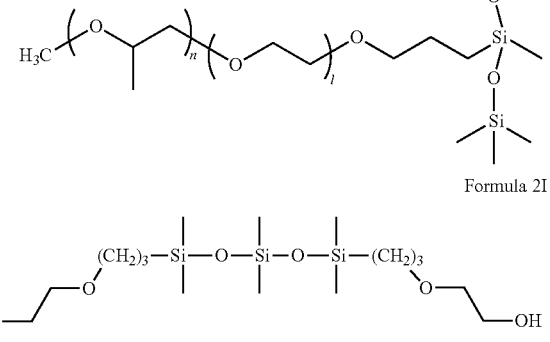

In Formulae 2C to 2I, m is an integer from 1 to 10, and n and l are each independently an integer from 1 to 10.

While not wanting to be bound by theory, the mechanism for improvement in lithium secondary battery performance by addition of the siloxane compound to the electrolyte according to an embodiment will be described in greater detail, in order to help with understanding of the disclosure but not for limiting the scope of the disclosure.

The siloxane compound represented by Formula 1 or Formula 2 may have a smaller surface tension than a carbonate-based solvent of the electrolyte and serve as a non-ionic surfactant, thus improving wettability of a thick electrode with the electrolyte.

The siloxane compound represented by Formula 2 may include a polyalkylene oxide group having suitable lithium ion conductivity to improve interfacial characteristics between an electrode of a lithium battery and the electrolyte. In particular, since siloxane compounds can reduce the crystallinity of a polyalkylene oxide, the electrolyte including the siloxane compound represented by Formula 2 may have further improved lithium ion conductivity.

When the siloxane compounds are added to the electrolyte, due to improved wettability of an electrode with respect to the electrolyte, resistance may be reduced. Accordingly, gas generation from side reactions between an electrode surface and the electrolyte may be suppressed, and the lithium secondary battery may have improved lifetime characteristics.

In an embodiment, the amount of the at least one siloxane compound may be about 0.05 wt % to about 20 wt %, about 0.1 wt % to about 18 wt %, about 0.2 wt % to about 15 wt %, about 0.5 wt % to about 10 wt %, or about 1 wt % to about 5 wt %, based on the total weight of the electrolyte. However, the disclosed embodiment is are not limited thereto. The amount of the at least one siloxane compound may be appropriately chosen within a range which does not hinder battery characteristics. When the amount of the at least one siloxane compound is within the above range, generation of gas from side reactions may be suppressed, and lifetime characteristics of the lithium secondary battery may be improved.

For example, the amount of the at least one siloxane compound may be about 0.05 wt % to about 10 wt %, based on the total weight of the electrolyte. For example, the amount of the at least one siloxane compound may be about 0.05 wt % to about 5 wt %, for example, about 0.1 wt % to about 5 wt %, for example, about 0.5 wt % to about 5 wt %, or for example, about 1 wt % to about 5 wt %, each based on the total weight of the electrolyte.

In an embodiment, the electrolyte may include only the siloxane compound represented by Formula 1 or the siloxane compound represented by Formula 2, or both the siloxane compound represented by Formula 1 and the siloxane compound represented by Formula 2.

For example, the electrolyte may include only the siloxane compound represented by Formula 1 in an amount of about 0.05 wt % to about 20 wt %, based on the total weight of the electrolyte. For example, the electrolyte may include only the siloxane compound represented by Formula 2 in an amount of about 0.05 wt % to about 20 wt %, based on the total weight of the electrolyte. For example, the electrolyte may include both the siloxane compound represented by Formula 1 and the siloxane compound represented by Formula 2 in an amount of about 0.05 wt % to about 20 wt %, based on the total weight of the electrolyte.

In an embodiment, the siloxane compound represented by Formula 1 and the siloxane compound represented by Formula 2 may each independently have a surface tension of about 20 milli-Neutons per meter (mN/m) to about 27 mN/m, about 21 mN/m to about 26 mN/m, about 22 mN/m to about 25 mN/m, or about 23 mN/m to about 24 mN/m. Surface tension may be determined by differential capillary rise, e.g., using a commercially available instrument, additional details of which can be determined by one of skill in the art without undue experimentation.

In an embodiment, the organic solvent may be at least one of a carbonate-based solvent, an ester-based solvent, an ether-based solvent, and a ketone-based solvent and a nitrile-based solvent.

For example, the carbonate-based solvent may be at least one of ethylmethyl carbonate (EMC), methylpropyl carbonate (MPC), ethylpropyl carbonate (EPC), dimethyl carbonate (DMC), diethyl carbonate (DEC), dipropyl carbonate (DPC), propylene carbonate (PC), ethylene carbonate (EC), fluoroethylene carbonate (FEC), vinylene carbonate (VC), vinylethylene carbonate (VEC), or butylene carbonate (BC), or the like. For example, the ester-based solvent may be at least one of methyl propionate, ethyl propionate, ethyl butyrate, methyl acetate, ethyl acetate, n-propyl acetate, dimethyl acetate, γ-butyrolactone, decanolide, γ-valerolactone, mevalonolactone, or caprolactone, or the like. For example, the ether-based solvent may be at least one of dibutyl ether, tetraglyme, diglyme, dimethoxyethane, 2-methyl tetrahydrofuran, or tetrahydrofuran, or the like. For example, the ketone-based solvent may be cyclohexanone. For example, the nitrile-based solvent may be at least one of acetonitrile (AN), succinonitrile (SN), or adiponitrile, or the like. In an embodiment, at least one of dimethyl sulfoxide, dimethyl formamide, dimethyl acetamide, or tetrahydrofuran, or the like, may be used. However, the disclosed embodiment is not limited thereto. Any suitable organic solvent available in the art may be used.

The above-listed organic solvents may be used alone or in a combination of two or more. When two or more of the organic solvents are used mixed, a mixing ratio of the organic solvents may be appropriately selected.

For example, the organic solvent may include at least one of ethylmethyl carbonate (EMC), methylpropyl carbonate (MPC), ethylpropyl carbonate (EPC), dimethyl carbonate (DMC), diethyl carbonate (DEC), dipropyl carbonate (DPC), propylene carbonate (PC), ethylene carbonate (EC), fluoroethylene carbonate (FEC), vinylene carbonate (VC), vinylethylene carbonate (VEC), or butylene carbonate (BC).

In an embodiment, the lithium salt may include at least one of $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, or a compound represented by Formulae 22 to 25.

Formula 22

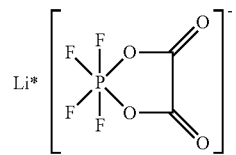

Formula 23

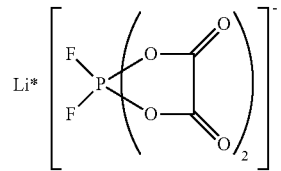

-continued

Formula 24

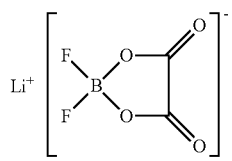

Formula 25

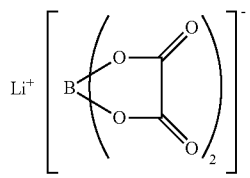

In an embodiment, a concentration of the lithium salt may be about 0.01 M to about 5.0 M, about 0.05 M to about 5.0 M, about 0.1 M to about 5.0 M, or about 0.1 M to about 2.0 M. However, the disclosed embodiment is not limited thereto. The concentration of the lithium salt may be determined by a person of skill in the art without undue experimentation. When the concentration of the lithium salt is within these ranges, further improved battery characteristics may be attained.

For example, the concentration of the lithium salt may be about 1.0 M to about 2.5 M. For example, the concentration of the lithium salt may be about 1.1 M to about 2.0 M. However, the concentration of the lithium salt is not limited to the above ranges. The concentration of the lithium salt may be in any range which allows the electrolyte to effectively transfer lithium ions and/or electrons during charge and discharge.

According to another aspect of the disclosure, a lithium secondary battery includes: a cathode including a cathode active material; an anode including an anode active material; and the electrolyte. The lithium secondary battery may have any suitable shape, not limited to a specific shape. The lithium secondary battery may be, for example, a lithium ion battery, a lithium ion polymer battery, or a lithium sulfur battery.

In an embodiment, the cathode and the anode of the lithium secondary battery may each independently have an electrode thickness corresponding to a capacity per unit area of about 4 milliampere-hours per square centimeter (mAh/cm$^2$) to about 7 mAh/cm$^2$, about 4.5 mAh/cm$^2$ to 6.5 mAh/cm$^2$, or about 5 mAh/cm$^2$.

In an embodiment, the lithium secondary battery may have a cell energy density per unit volume of about 500 Watt-hours per liter (Wh/L) or greater, or about 600 Wh/L or greater, or about 700 Wh/L or greater, or about 500 Wh/L to about 100 Wh/L, or about 500 Wh/L to about 750 Wh/L, or about 600 Wh/L to about 750 Wh/L. The lithium secondary battery according to an embodiment may provide a high output with a high cell energy density of about 500 Wh/L or greater.

The lithium secondary battery according to an embodiment may be manufactured in the following manner.

First, the cathode may be prepared.

For example, a cathode active material, a conducting agent, a binder, and a solvent may be mixed together to prepare a cathode active material composition. In an embodiment, the cathode active material composition may be directly coated on a metallic current collector and dried to form a cathode. In an embodiment, the cathode active material composition may be cast on a separate support to form a cathode active material film, which may then be separated from the support and laminated on a metallic current collector to form a cathode. The cathode is not limited to the above-described examples, and may be any of a variety of types.

The cathode active material may be a lithium-containing metal oxide, and may be any suitable material available in the art. For example, the cathode active material may be at least one of a composite oxide of lithium with a metal and may be at least one of cobalt (Co), manganese (Mn), or nickel (Ni).

For example, the cathode active material may be a compound represented by one of the following formulae: $Li_aA_{1-b}B'_bD_2$ (wherein 0.90≤a≤1.8, and 0≤b≤0.5); $Li_aE_{1-b}B'_bO_{2-c}D_c$ (wherein 0.90≤a≤1.8, 0≤b≤0.5, and 0≤c≤0.05); $LiE_{2-b}B'_bO_{4-c}D_c$ (wherein 0≤b≤0.5, and 0≤c≤0.05); $Li_aNi_{1-b-c}Co_bB'_cD_\alpha$ (wherein 0.90≤a≤1.8, 0≤b≤0.5, 0≤c≤0.05, and 0<α≤2); $Li_aNi_{1-b-c}Co_bB'_cO_{2-\alpha}F'_\alpha$ (wherein 0.90≤a≤1.8, 0≤b≤0.5, 0≤c≤0.05, and 0<α<2); $Li_aNi_{1-b-c}Co_bB'_cO_{2-\alpha}F'_2$ (wherein 0.90≤a≤1.8, 0≤b≤0.5, 0≤c≤0.05, and 0<α<2); $Li_aNi_{1-b-c}Mn_bB'_cD_\alpha$ (wherein 0.90≤a≤1.8, 0≤b≤0.5, c≤0.05, and 0<α≤2); $Li_aNi_{1-b-c}Mn_bB'_cO_{2-\alpha}F'_\alpha$ (wherein 0.90≤a≤1.8, 0≤b≤0.5, 0≤c≤0.05, and 0<α<2); $Li_aNi_{1-b-c}Mn_bB'_cO_{2-\alpha}F'_2$ (wherein 0.90≤a≤1.8, 0≤b≤0.5, 0≤c≤0.05, and 0<α<2); $Li_aNi_bE_cG_dO_2$ (wherein 0.90≤a≤1.8, 0≤b≤0.9, 0≤c≤0.5, and 0.001≤d≤0.1); $Li_aNi_bCo_cMn_dGeO_2$ (wherein 0.90≤a≤1.8, 0≤b≤0.9, 0≤c≤0.5, 0≤d≤0.5, and 0.001≤e≤0.1); $Li_aNiG_bO_2$ (wherein 0.90≤a≤1.8, and 0.001≤b≤0.1); $Li_aCoG_bO_2$ (wherein 0.90≤a≤1.8, and 0.001≤b≤0.1); $Li_aMnG_bO_2$ (wherein 0.90≤a≤1.8, and 0.001≤b≤0.1); $Li_aMn_2G_bO_4$ (wherein 0.90≤a≤1.8, and 0.001≤b≤0.1); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein 0≤f≤2); $Li_{(3-f)}Fe_2(PO_4)_3$ (wherein 0≤f≤2); or $LiFePO_4$.

In the above formulae, A may be at least one of Ni, Co, or Mn; B' may be at least one of Al, Ni, Co, Mn, Cr, Fe, Mg, Sr, V, or a rare earth element; D may be at least one of O, F, S, or P; E may be at least one of Co or Mn; F' may be at least one of F, S, or P; G may be at least one of Al, Cr, Mn, Fe, Mg, La, Ce, Sr, or V; Q may be at least one of Ti, Mo, or Mn; I' may be at least one of Cr, V, Fe, Sc, or Y; and J may be at least one of V, Cr, Mn, Co, Ni, or Cu.

For example, the cathode active material may be $LiCoO_2$, $LiMn_xO_{2x}$ (wherein x=1 or 2), $LiNi_{1-x}Mn_xO_{2x}$ (wherein 0<x<1), $LiNi_{1-x-y}Co_xMn_yO_2$ (wherein 0≤x≤0.5, 0≤y≤0.5, and 1−x−y>0.5), or $LiFePO_4$. For example, the cathode active material may be $LiNi_{1-x-y}Co_xMn_yO_2$ (wherein 0.02≤x≤0.2, 0.02≤y≤0.2, and 0.61≤1−x−y≤0.96).

The compounds listed above as cathode active materials may have a surface coating layer (hereinafter, also referred to as "coating layer"). Alternatively, a mixture of a compound without a coating layer and a compound with a coating layer, the compounds being at least one of the compounds listed above, may be used. In an embodiment, the coating layer may include at least one compound of a coating element of an oxide, a hydroxide, an oxyhydroxide, an oxycarbonate, or a hydroxycarbonate of the coating element. In an embodiment, the compound for the coating layer may be amorphous or crystalline. In an embodiment, a coating element of the coating layer may be at least one of magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), or zirconium (Zr). In an embodiment, the coating layer may be formed using any suitable method that does not adversely affect the physical properties of the cathode active material when a compound of the coating element is used. For example, the coating layer may be formed using a spray coating method, or a dipping method. The details of the coating methods may be determined by one of skill in the art, and thus a further detailed description thereof will be omitted.

The conducting agent may be any suitable material having suitable electrical conductivity, and not causing an undesirable chemical change in the lithium secondary battery. Non-limiting examples of the conducting agent may include graphite, such as natural graphite or artificial graphite; carbon black, acetylene black, Ketjen black, channel black, furnace black, lamp black, or summer black; conductive fibers, such as carbon fibers or metal fibers; carbon fluoride; metal powder, such as aluminum or nickel powder; conductive whiskers, such as zinc oxide or potassium titanate; a conductive metal oxide, such as a titanium oxide; or a conductive material, such as a polyphenylene derivative. A combination comprising at least one of the foregoing may be used.

For example, an amount of the conducting agent may be about 1 wt % to about 20 wt % based on a total weight of the cathode active material composition.

The binder may facilitate binding between the cathode active material and the conducting agent, and binding to the current collector. For example, an amount of the binder may be about 1 wt % to about 30 wt %, based on a total weight of the cathode active material composition. Non-limiting examples of the binder may be at least one of polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenylene sulfide, polyamide imide, polyether imide, polyethylene sulfone, polyamide, polyacetal, polyphenylene oxide, polybutylene terephthalate, an ethylene-propylene-diene monomer (EPDM), sulfonated EPDM, styrene-butadiene rubber (SBR), or a fluoro rubber, or a copolymer.

The solvent may be, for example, at least one of N-methylpyrrolidone, acetone, or water. However, the disclosed embodiment is not limited thereto. Any suitable solvent available in the art may be used. For example, an amount of the solvent may be about 10 parts to about 100 parts by weight, with respect to 100 parts by weight of the cathode active material. When the amount of the solvent is within this range, it may become easy to form the cathode active material layer.

The amount of the cathode active material, the conducting agent, the binder, and the solvent may be determined by one of skill in the art of lithium secondary batteries without undo experimentation. At least one of the conducting agent, the binder, and the solvent may be omitted depending on the use and structure of the lithium secondary battery.

For example, N-methylpyrrolidone (NMP) may be used as the solvent, PVdF or a PVdF copolymer may be used as the binder, and carbon black or acetylene black may be used as the conducting agent. For example, after about 94 wt % of the cathode active material, about 3 wt % of the binder, and about 3 wt % of the conducting agent are mixed together to obtain a mixture in power form, NMP may be added to the mixture to prepare a slurry having a solid content of about 70 wt %. This slurry may then be coated, dried, and roll-pressed, to thereby manufacture a cathode. In an embodiment, after about 95 wt % of the cathode active material, about 2.5 wt % of the binder, and about 2.5 wt % of the conducting agent are mixed together to obtain a mixture in power form, NMP may be added to the mixture to prepare a slurry having a solid content of about 70 wt %. This slurry may then be coated, dried, and roll-pressed, to thereby manufacture a cathode.

The cathode current collector may have a thickness of about 3 µm to about 50 µm. The cathode current collector is not particularly limited, and may be any material having conductivity and causing no chemical change in the battery. For example, the cathode current collector may be stainless steel, aluminum, nickel, titanium, sintered carbon, or aluminum or stainless steel that is surface-treated with carbon, nickel, titanium, or silver. For example, the cathode current collector may be processed to have an uneven surface with fine projections and recesses to enhance the adhesion of the cathode active material to the surface of the cathode current collector. The cathode current collector may be in any of various forms, including a film, a sheet, a foil, a net, a porous structure, a foam, and a non-woven fabric.

The cathode may have a thickness corresponding to a capacity per unit area of about 4 mAh/cm$^2$ to about 7 mAh/cm$^2$, for example, about 4.5 mAh/cm$^2$ to about 7 mAh/cm$^2$, or about 5 mAh/cm$^2$ to about 7 mAh/cm$^2$. When the cathode has the thickness corresponding to a capacity per unit area within these ranges, high capacity may be implemented.

A loading level of the cathode active material composition may be about 30 milligrams per square centimeter (mg/cm$^2$) or greater, for example, about 35 mg/cm$^2$ or greater, or for example, about 40 mg/cm$^2$ or greater, e.g., about 30 mg/cm$^2$ to about 200 mg/cm$^2$, about 35 mg/cm$^2$ to about 175 mg/cm$^2$, or about 40 mg/cm$^2$ to about 150 mg/cm$^2$. The cathode may have an electrode density of about 3 grams per cubic centimeter (g/cc) or greater, for example, about 3.5 g/cc, or about 3 g/cc to about 10 g/cc. For an energy density-focused design, the loading level may be about 35 mg/cm$^2$ or greater to about 50 mg/cm$^2$ or less, and the electrode density may be about 3.5 g/cc or greater to about 4.2 g/cc or less. For example, the cathode plate (cathode) may be double-side coated at a loading level of about 37 mg/cc with a density of about 3.6 g/cc.

When the loading level of the cathode active material and the electrode density are within the above ranges, the cathode may have a capacity per unit area within the above-described ranges, and a lithium secondary battery including the cathode active material may exhibit a high cell energy density of about 500 Wh/L or greater. A direct current internal resistance (DCIR) increase of the lithium secondary battery may be about 165% or less after 300 charge and discharge cycles at 45° C., relative to an initial DCIR.

Next, the anode may be prepared.

For example, an anode active material, a conducting agent, a binder, and a solvent may be mixed together to prepare an anode active material composition. The anode active material composition may be directly coated on an anode current collector and dried to form an anode. In an embodiment, the anode active material composition may be cast on a separate support to form an anode active material film, which may then be separated from the support and laminated on a metallic current collector to form an anode plate.

The anode active material may be any anode active material for lithium batteries available in the art. For example, the anode active material may include at least one of a silicon-based compound, a carbonaceous material, a composite of a silicon-based compound and a carbonaceous material, a silicon oxide ($SiO_x$, wherein $0<x<2$), a lithium metal, or a metal alloyable with lithium.

For example, the anode active material may be a silicon-based compound, a carbonaceous material, a silicon oxide ($SiO_x$, wherein $0<x<2$), or a composite of a silicon-based compound and a carbonaceous material. In the silicon-based compound or the composition of a silicon-based compound and a carbonaceous material, silicon (Si) particles may have a size (for example, an average particle diameter) less than 200 nm, for example, about 10 nm to about 150 nm. The term "size" may refer to an average particle diameter when the silicon particles are spherical or an average major axis's length when the silicon particles are non-spherical.

For example, the metal alloyable with lithium may be at least one of Si, Sn, Al, Ge, Pb, Bi, Sb a Si—Y alloy (wherein Y' may be at least one of an alkali metal, an alkaline earth metal, a Group 13 element, a Group 14 element, a transition metal, or a rare earth element, but Y is not Si), or a Sn—Y' alloy (wherein Y' may be an alkali metal, an alkaline earth metal, a Group 13 element, a Group 14 element, a transition metal, or a rare earth metal, but Y' is not Sn). For example, Y' may be at least one of magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), or polonium (Po).

For example, the anode active material may be a lithium titanium oxide, a vanadium oxide, or a lithium vanadium oxide.

For example, the carbonaceous material may be crystalline carbon, amorphous carbon, or a mixture thereof. Non-limiting examples of the crystalline carbon may be graphite, such as natural graphite or artificial graphite that are in amorphous, plate, flake, spherical, or fibrous form. Non-limiting examples of the amorphous carbon may be soft carbon (carbon sintered at low temperatures), hard carbon, meso-phase pitch carbides, and sintered cokes.

For example, the composite of a silicon-based compound and a carbonaceous material may be a composite with a structure in which silicon particles are on graphite, or a composite with a structure in which silicon particles are on graphite surface and inside graphite. For example, the composite may be an active material obtained by dispersing silicon (Si) particles having an average particle diameter of about 200 nm or less, for example, about 100 nm to about 200 nm, or for example, 150 nm on graphite particles, and coating carbon thereon, or an active material including Si particles on and inside graphite. These composites may be commercially available under the product name "SCN1" (Si particle on Graphite) or "SCN2" (Si particle inside as well as on Graphite). SCN1 is an active material with a carbon coating on Si particles having an average particle diameter of about 150 nm dispersed on graphite particles, and SCN2 is an active material including Si particles having an average particle diameter of about 150 nm on and inside graphite.

The conducting agent and the binder used in the anode active material composition may be the same as those used in the above-described cathode active material composition.

For example, the anode active material composition may use water as the solvent. For example, the solvent may be water, the binder may be carboxymethyl cellulose (CMC), a styrene-butadiene rubber (SBR), an acrylate-based polymer, or a methacrylate-based polymer, and the conducting agent may be carbon black, acetylene black, or graphite.

The amounts of the anode active material, the conducting agent, the binder, and the solvent may be the same levels as those commonly used in lithium batteries. At least one of the conducting agent, the binder, and the solvent may be omitted depending on the use and structure of the lithium battery.

For example, after about 94 wt % of the anode active material, about 3 wt % of the binder, and about 3 wt % of the conducting agent are mixed together to obtain a mixture in power form, water may be added to the mixture to prepare a slurry having a solid content of about 70 wt %. This slurry may then be coated, dried, and roll-pressed, to thereby manufacture an anode plate. In some embodiments, after about 96 wt % of the anode active material and about 4 wt % of the binder are mixed together to obtain a mixture in power form, water may be added to the mixture to prepare a slurry having a solid content of about 70 wt %. This slurry may then be coated, dried, and roll-pressed, to thereby manufacture a cathode plate.

The anode current collector may have a thickness of, for example, about 3 um to about 50 um. The anode current collector may be any material having conductivity and causing no chemical change in the battery. For example, the anode current collator may be copper, stainless steel, aluminum, nickel, titanium, sintered carbon, or copper or stainless steel that is surface-treated with carbon, nickel, titanium, or silver, or an aluminum-cadmium alloy. For example, like the cathode current collector, the anode current collector may be processed to have an uneven surface with fine projections and recesses to enhance the adhesion of the anode active material to the surface of the anode current collector. The anode current collector may be in any of various forms, including a film, a sheet, a foil, a net, a porous structure, a foam, and a non-woven fabric.

The anode may have a thickness corresponding to a capacity per unit area of about 4.0 $mAh/cm^2$ to about 7.0 $mAh/cm^2$, for example, about 4.5 $mAh/cm^2$ to about 7.0 $mAh/cm^2$. When the anode has a thickness corresponding to a capacity per unit area within these ranges, high capacity may be implemented.

A loading level of the anode active material composition may be determined depending on the loading level of the cathode active material composition. For example, a loading level of the anode active material composition may be, depending on capacity per gram, for example, about 12 $mg/cm^2$ or greater, or about 15 $mg/cm^2$ or greater. The anode may have an electrode density of about 1.5 g/cc or greater, for example, about 1.6 g/cc or greater. For an energy density-focused design, the electrode density may be about 1.65 g/cc or greater to about 1.9 g/cc or less.

When the loading level of the anode active material and the electrode density are within the above ranges, the anode may have a capacity per unit area within the above-described ranges, and a lithium battery including the anode active material may exhibit a high cell energy density of about 500 Wh/L or greater.

Next, a separator to be interposed between the cathode and the anode may be prepared. The separator may be any separator commonly used for lithium batteries in the art. The separator may be a separator having low resistance to migration of ions in an electrolyte and an excellent electrolyte-retaining ability. For example, the separator may be at least one of a glass fiber, polyester, Teflon, polyethylene, polypropylene, or polytetrafluoroethylene (PTFE), each of which may commonly be in the form of a non-woven or may be in the form of a woven fabric. For example, a rollable separator including polyethylene or polypropylene may be used for a lithium ion battery. A separator with an excellent organic electrolyte-retaining ability may be used for a lithium ion polymer battery.

For example, the separator may be prepared in the following manner. A polymer resin, a filler, and a solvent may be mixed together to prepare a separator composition. The separator composition may be directly coated on an electrode and then dried to thereby form the separator. In an embodiment, the separator composition may be cast on a support and then dried to form a separator film. This separator film may then be separated from the support and laminated on an electrode to thereby form the separator.

The polymer resin used in the manufacture of the separator is not specifically limited, and may be any suitable material used as a binder for electrode plates. For example, the polymer resin used in the manufacture of the separator may be at least one of a vinylidenefluoride/hexafluoropropylene copolymer, polyvinylidene fluoride (PVDF), polyacrylonitrile, or polymethylmethacrylate.

Next, the electrolyte according to an embodiment may be prepared.

Figure 5:
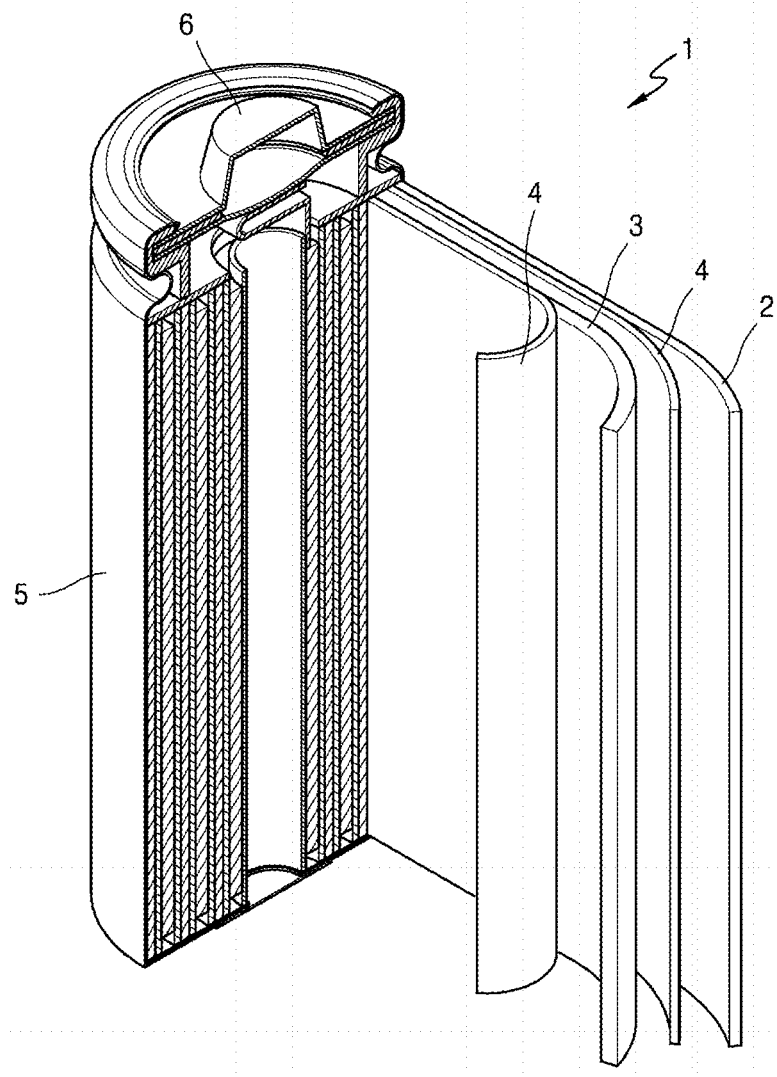
FIG. 5 is a schematic view of a lithium secondary battery according to an embodiment.

Referring to FIG. 5, a lithium secondary battery 1 according to an embodiment may include a cathode 3, an anode 2, and a separator 4. The cathode 3, the anode 2, and the separator 4 may be wound or folded, and then sealed in a battery case 5. Subsequently, an electrolyte according to any of the embodiments may be injected into the battery case 5, and the battery case 5 may then be sealed with a cap assembly 6, to thereby complete the manufacture of the lithium secondary battery 1. For example, the battery case 5 may be a cylindrical type, a rectangular type, or a thin-film type. For example, the lithium secondary battery 1 may be a large, thin-film type battery. For example, the lithium secondary battery 1 may be a lithium ion battery.

In an embodiment, the cathode and the anode with the separator interposed therebetween may form a battery structure. This battery structure may be stacked on another to form a bicell structure. The bicell structure may be impregnated with an electrolyte according to any of the embodiments and then accommodated and sealed in a pouch, to thereby complete the manufacture of a lithium ion polymer battery.

In an embodiment, a plurality of battery structures may be stacked upon one another to form a battery pack. This battery pack may be used in any device benefitting from high capacity and high power output, for example, in laptop computers, smart phones, electric vehicles, and the like.

For example, the lithium secondary battery may be used in, for example, power tools actuated by electric motors; electric vehicles (EVs), including hybrid electric vehicles (HEVs), plug-in hybrid electric vehicles (PHEV), and the like; electric two-wheeled vehicles, including electric bicycles and electric scooters; electric golf carts; or power storage systems. However, an embodiment is not limited thereto.

As used herein, the term "alkyl" refers to a saturated, monovalent, branched or unbranched (or straight-chained or linear) hydrocarbon group. Non-limiting examples of the "alkyl" group are methyl, ethyl, n-propyl, isopropyl, n-butyl, isobutyl, sec-butyl, n-pentyl, isopentyl, neopentyl, n-hexyl, 3-methylhexyl, 2,2-dimethylpentyl, 2,3-dimethylpentyl, and n-heptyl. Unless otherwise indicated the alkyl group may have 1 to 30 carbon atoms.

At least one hydrogen atom of the "alkyl" group may be substituted with a halogen atom, a C1-C20 alkyl group substituted with a halogen atom (for example, $CF_3$, $CHF_2$, $CH_2F$, $CCl_3$, and the like), a C1-C20 alkoxy group, a C2-C20 alkoxyalkyl group, a hydroxyl group (—OH), a nitro group (—$NO_2$), a cyano group (—CN), an amino group (—$NH_2$), an amidino group (—C(=NH)$NH_2$), a hydrazino (—$NHNH_2$), a hydrazono (=N—$NH_2$), a carboxylic acid group (—C(=O)OH) or a salt thereof (—C(=O)OM) wherein M is an organic or inorganic anion), a sulfonyl group (—S(=O)$_2$—), a sulfamoyl group (—$SO_2NH_2$), a sulfonic acid group (—$SO_3H_2$) or a salt thereof (—$SO_3MH$ or —$SO_3M_2$ wherein M is an organic or inorganic anion), a phosphoric acid group (—$PO_3H_2$) or a salt thereof (—$PO_3MH$ or —$PO_3M_2$ wherein M is an organic or inorganic anion), a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxyl group, a C6-C20 heteroaryloxyalkyl group, or a C6-C20 heteroarylalkyl group.

The term "halogen" indicates fluorine, bromine, chloride, or iodine.

"Alkylene" means a straight or branched chain, saturated, divalent aliphatic hydrocarbon group, (e.g., methylene (—$CH_2$—) or, propylene (—($CH_2$)$_3$—)).

"Alkylene oxide" means an aliphatic C2 to C100 epoxide, for example ethylene oxide, propylene oxide or butylene oxide.

"Alkenylene" means a straight or branched chain, divalent hydrocarbon group having at least one carbon-carbon double bond (e.g., ethenylene (—HC=CH—)).

"Alkynylene" means a straight or branched chain divalent aliphatic hydrocarbon that has at least one unsaturated carbon-carbon bonds, at least one of which is a triple bond (e.g., ethynylene).

The term "alkoxy" means an alkyl group that is linked via an oxygen (i.e., alkyl-O—_). Non-limiting examples of the alkoxy group may include a methoxy group, an ethoxy group, a 2-propoxygroup, a butoxy group, a t-butoxy group, a pentyloxy group, a hexyloxy group, or the like. At least one hydrogen atom in the alkoxy group may be substituted with a substituent described above.

The term "alkenyl" group as used herein refers to a branched or unbranched, monovalent hydrocarbon having at least one carbon-carbon double bond. Non-limiting examples of the alkenyl group include a vinyl group, an allyl group, butenyl, propenyl, and isobutenyl. At least one hydrogen atom in the alkenyl group may be substituted with a substituent described above.

The term "alkynyl" group as used herein refers to a branched or unbranched, monovalent hydrocarbon having at least one carbon-carbon triple bond. Non-limiting examples of the "alkynyl" group include ethynyl, butynyl, isobutynyl, and isopropynyl. At least one hydrogen atom in the "alkynyl" group may be substituted with a substituent described above.

The term "aryl" group as used herein refers to a hydrocarbon group that includes an aromatic ring and includes monocyclic and polycyclic hydrocarbons wherein the additional ring(s) of the polycyclic hydrocarbon may be aromatic or nonaromatic. Non-limiting examples of the "aryl" group include phenyl, naphthyl, and tetrahydronaphthyl. At one hydrogen atom of the "aryl" group may be substituted with a substituent described above.

The term "heteroaryl" group as used herein refers to a monovalent carbocyclic ring group that includes at least one aromatic ring, in which at least one ring member (e.g., one, two or three ring members) is a heteroatom. Multiple rings, if present, may be pendent, spiro or fused. In a C3 to C30 heteroaryl, the total number of ring carbon atoms ranges from 3 to 30, with remaining ring atoms being heteroatoms. The heteratom(s) are independently at least one of nitrogen (N), oxygen (O), phosphorous (P), and sulfur (S). In the heteroaryl group, S or N may be present in various oxidized forms.

Non-limiting examples of the heteroaryl group include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazole-5-yl, tetrazolyl, pyridin-2-yl, pyridin-3-yl, pyridin-4-yl, pyrazin-2-yl, pyrimidin-2-yl, pyrimidin-4-yl, and pyrimidin-5-yl.

"Heteroarylalkyl" means a heteroaryl group linked via an alkylene moiety. The specified number of carbon atoms (e.g., C3 to C30) means the total number of carbon atoms present in both the aryl and the alkylene moieties, with remaining ring atoms being heteroatoms as discussed above.

"Aryloxy" means an aryl moiety that is linked via an oxygen (i.e., —O-aryl). An aryloxy group includes a C6 to C30 aryloxy group, and specifically a C6 to C18 aryloxy group. Non-limiting examples include phenoxy, naphthyloxy, and tetrahydronaphthyloxy.

The term "heteroaryl" includes a case where a heteroaromatic ring is selectively fused to at least one of an aryl group, a cycloaliphatic group, or a heterocyclic group.

An embodiment of the disclosure will now be described in detail with reference to the following examples. However, these examples are only for illustrative purposes and are not intended to limit the scope of the disclosed embodiment of the disclosure.

EXAMPLES

Preparation of Electrolyte

Preparation Example 1

1 wt % of a compound represented by Formula 1B (having a weight average molecular weight of 3,000 g/mol) was added to a non-aqueous organic solvent mixture of ethylene carbonate (EC), ethylmethyl carbonate (EMC), and dimethyl carbonate (DMC) in a volume ratio of about 15:45:40 to prepare an organic electrolyte, wherein 1.0 M $LiPF_6$ was used as a lithium salt.

Formula 1B

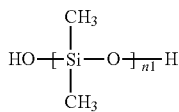

Preparation Example 2

1 wt % of a compound represented by Formula 2G (having a weight average molecular weight of 600 g/mol, and a surface tension of about 21.5 mN/m) was added to a non-aqueous organic solvent mixture of ethylene carbonate (EC), ethylmethyl carbonate (EMC), and dimethyl carbonate (DMC) in a volume ratio of about 15:45:40 to prepare an organic electrolyte, wherein 1.0 M $LiPF_6$ was used as a lithium salt.

Formula 2G

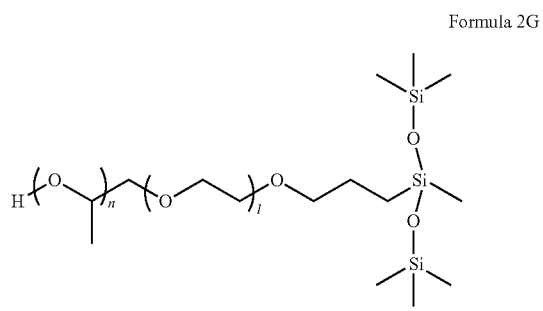

In Formula 2G, l is 2, and n is 3.

Preparation Example 3

1 wt % of a compound represented by Formula 2C (having a weight average molecular weight of 600 g/mol, and a surface tension of about 21.5 mN/m) was added to a non-aqueous organic solvent mixture of ethylene carbonate (EC), ethylmethyl carbonate (EMC), and dimethyl carbonate (DMC) in a volume ratio of about 15:45:40 to prepare an organic electrolyte, wherein 1.0 M $LiPF_6$ was used as a lithium salt.

Formula 2C

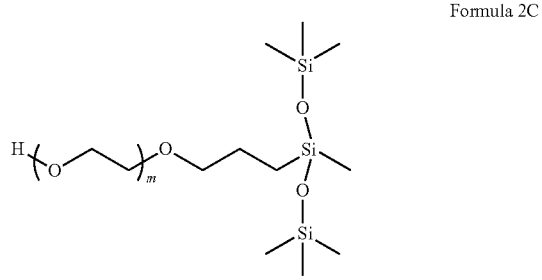

In Formula 2C, m is 7.

Comparative Preparation Example 1

An organic electrolyte was prepared using a non-aqueous organic solvent mixture of ethylene carbonate (EC), ethylmethyl carbonate (EMC), and dimethyl carbonate (DMC) in a volume ratio of about 15:45:40, and 1.0 M $LiPF_6$ as a lithium salt.

Example 1: Manufacture of Lithium Secondary Battery

Manufacture of Cathode $LiNi_{0.88}Co_{0.08}Mn_{0.04}O_2$ as a cathode active material, Denka black as a conducting agent, and PVdF as a binder were mixed in a weight ratio of about 95:2.5:2.5. This mixture was added to N-methylpyrrolidone (NMP) solvent to reach a solid content of about 70%, and then dispersed with a mechanical stirrer for about 30 minutes to prepare a cathode active material composition. This cathode active material composition was coated on both sides of an aluminum foil current collector having a thickness of about 12 μm with a 3-roll coater to a thickness corresponding to a capacity per unit area of about 6.0 mAh/cm$^2$ on each surface, dried in a 100° C. hot-air drier for about 0.5 hours, further dried under vacuum conditions at about 120° C. for about 4 hours, and then roll-pressed, to thereby manufacture a cathode with a cathode active material layer on the current collector.

Manufacture of Anode

Graphite powder as a anode active material and a mixture of styrene-butadiene rubber and carboxymethylcellulose (SBR-CMC) as a binder were mixed in a weight ratio of about 96:4. This mixture was added to distilled water to reach a solid content of about 70% and then dispersed with a mechanical stirrer for about 60 minutes to thereby prepare an anode active material composition. This anode active material composition was coated on both sides of a copper foil current collector having a thickness of about 10 μm with a 3-roll coater to a thickness corresponding to a capacity per unit area of about 6.0 mAh/cm$^2$ on each surface, dried in a 100° C. hot-air drier for about 0.5 hours, further dried under vacuum conditions at about 120° C. for about 4 hours, and then roll-pressed, to thereby manufacture an anode with a anode active material layer on the current collector.

Assembly of Lithium Secondary Battery

A lithium secondary battery was assembled with the cathode, the anode, a polyethylene separator, and the electrolyte prepared in Preparation Example 1.

Comparative Example 1

A lithium secondary battery was manufactured in the same manner as in Example 1, except that the electrolyte of Comparative Preparation Example 1 was used instead of the electrolyte of Preparation Example 1.

Examples 2 and 3

Manufacture of Cathode

Cathodes were manufactured in the same manner as in Example 1, except that the cathode active material composition was coated on both sides of the current collector to a thickness corresponding to a capacity per unit area of about 3.4 mAh/cm$^2$.

Manufacture of Anode

Anodes were manufactured in the same manner as in Example 1, except that the anode active material composition was coated on both sides of the current collector to a thickness corresponding to a capacity per unit area of about 3.4 mAh/cm$^2$.

Assembly of Lithium Secondary Battery

Lithium secondary batteries were assembled with the cathodes, the anodes, polyethylene separators, and the electrolytes of Preparation Examples 2 and 3, respectively.

Comparative Example 2

A lithium secondary battery was manufactured in the same manner as in Example 2, except that the electrolyte of Comparative Preparation Example 1 was used instead of the electrolyte of Preparation Example 2.

Evaluation of Impregnability and Wettability of Electrolyte

Evaluation Example 1

After 0.002 mL of the electrolytes of Preparation Example 1 and Comparative Preparation Example 1 were each dropped onto a surface of an anode manufactured as described above, an electrolyte drop area on the surface of the anode on which the electrolyte had been dropped was observed immediately after the electrolyte was dropped and at 3 minutes after dropping of the electrolyte. The results are shown in FIGS. 1A to 1D. A degree of reduction of the electrolyte drop area in comparison to that immediately after the electrolyte dropping was evaluated as the impregnability of the electrolyte into the anode (i.e., the permeation property of the electrolyte in a vertical direction into the anode).

Figure 1B:
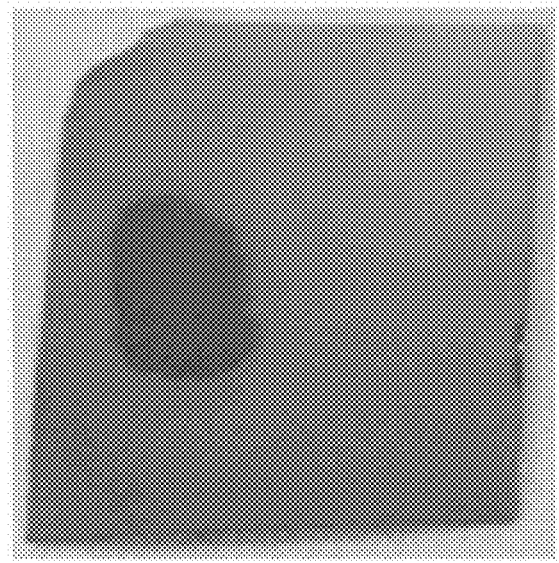
Figure 1C:
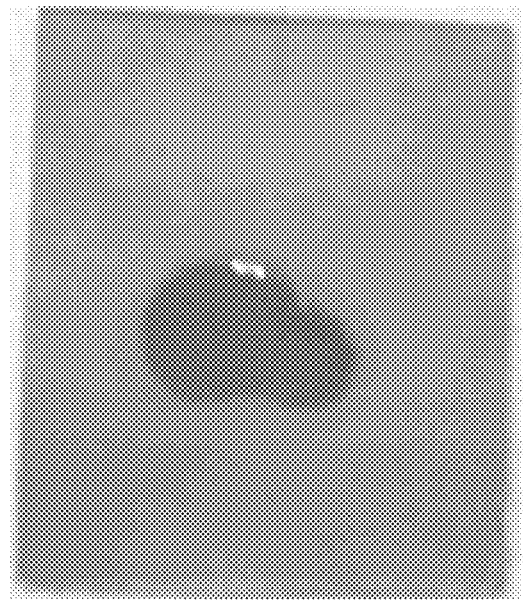
Figure 1D:
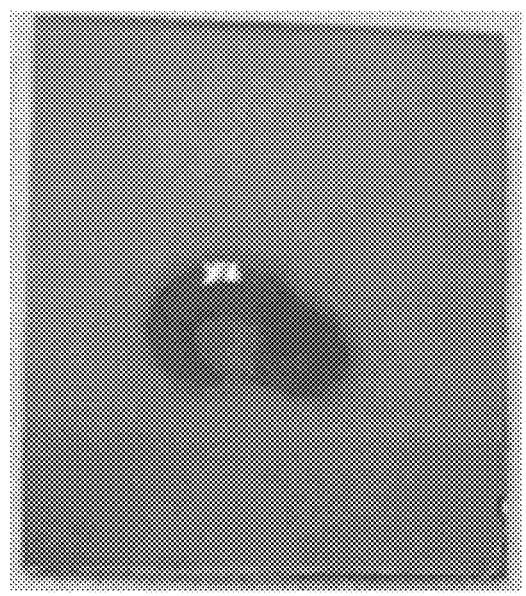

FIGS. 1A and 1C are images of the electrolyte drop areas of the electrolytes of Comparative Preparation Example 1 and Preparation Example 1 on anode surfaces, respectively, immediately after the electrolyte dropping. FIGS. 1B and 1D are images of the electrolyte drop areas of the electrolytes of Comparative Preparation Example 1 and Preparation Example 1 on anode surfaces, respectively, at 3 minutes after dropping of the electrolyte.

Referring to FIGS. 1A to 1D, the electrolyte of Preparation Example 1 according to an embodiment was found to have improved impregnability, as compared with the electrolyte of Comparative Preparation Example 1 not including a siloxane compound.

Evaluation Example 2

After 0.002 mL of the electrolytes of Preparation Example 3 and Comparative Preparation Example 1 were each dropped onto a surface of an anode manufactured as described above, an electrolyte drop area on the surface of the anode was observed immediately after dropping and at 3 minutes after dropping. The results are shown in FIGS. 2A to 2D. The electrolyte drop area immediately after dropping was evaluated as the wettability of the electrolyte (i.e., spreading ability of the electrolyte in a horizontal direction), and a degree of reduction of the electrolyte drop area in comparison to that immediately after dropping was evaluated as the impregnability of the electrolyte into the anode.

Figure 2A:
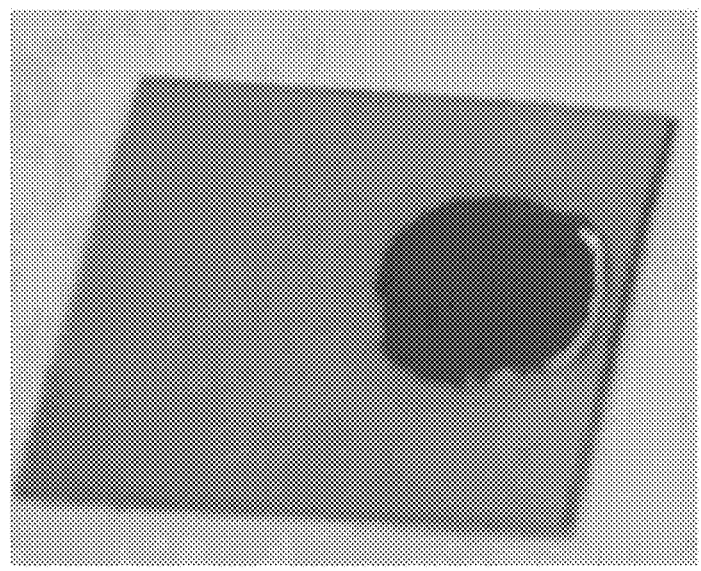
FIGS. 2A to 2D are images illustrating results of evaluation of impregnability and wettability of each of electrolytes prepared in Preparation Example 3 and Comparative Preparation Example 1.
Figure 2B:
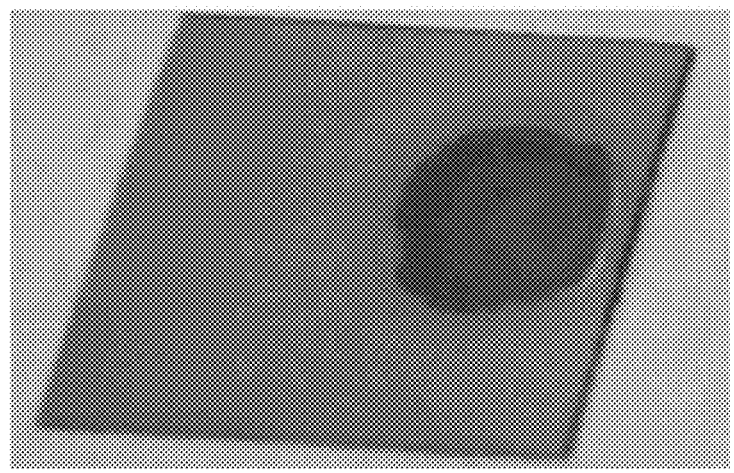
Figure 2C:
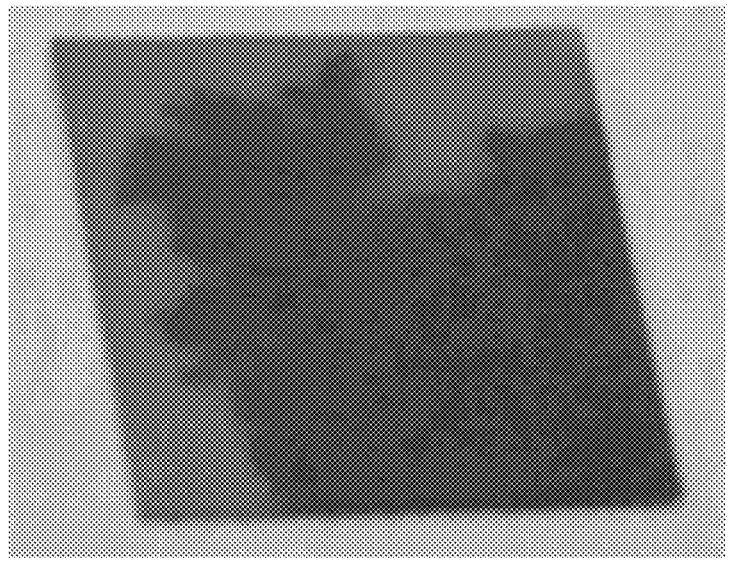
Figure 2D:
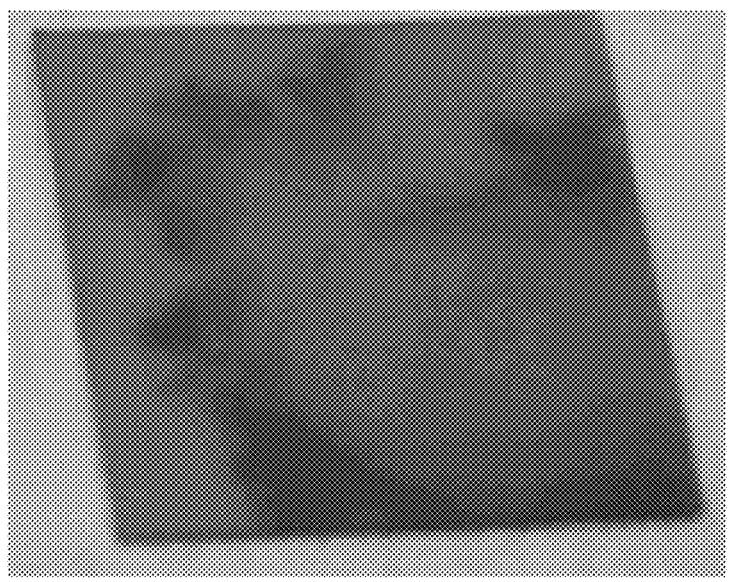

FIGS. 2A and 2C are images of the electrolyte drop areas of the electrolytes of Comparative Preparation Example 1 and Preparation Example 3 on anode surfaces, respectively, immediately after dropping of the electrolyte. FIGS. 2B and 2D are images of the electrolyte drop areas of the electrolytes of Comparative Preparation Example 1 and Preparation Example 3 on anode surfaces, respectively, at 3 minutes after dropping of the electrolyte.

Referring to FIGS. 2A to 2D, the electrolyte of Preparation Example 3 according to an embodiment was found to have improved impregnability and improved wettability, as compared with the electrolyte of Comparative Preparation Example 1 not including a siloxane compound.

Evaluation of Room Temperature (25° C.) Charge and Discharge Characteristics

Evaluation Example 3

The lithium secondary batteries of Example 1 and Comparative Example 1 were each charged at room temperature (25° C.) with a constant current of 0.1 C rate until a voltage of 4.3V (with respect to Li) was reached, and then with a constant voltage of 4.3V (constant voltage mode) with a cutoff current of 0.05 C rate, and subsequently discharged with a constant current of 0.1 C rate until a voltage of 2.8 V (with respect to Li) was reached (formation process, 1$^{st}$ cycle).

Each of the lithium secondary batteries after the 1$^{st}$ cycle of the formation process was charged at 25° C. with a constant current of 0.2 C rate until a voltage of 4.3V (with respect to Li) was reached, and then with a constant voltage of 4.3V (constant voltage mode) with a cut-off current of 0.05 C rate, and subsequently discharged with a constant current of 0.2 C rate until a voltage of 2.8V (with respect to Li) was reached (formation process, 2$^{nd}$ cycle).

Each of the lithium secondary batteries after the 2$^{nd}$ cycle of formation process was charged at 25° C. with a constant current of 0.5 C rate until a voltage of 4.3V (with respect to Li) was reached, and then with a constant voltage of 4.3 V (constant voltage mode) with a cut-off current of 0.05 C rate, and subsequently discharged with a constant current of 1.0 C rate until a voltage of 2.8V (with respect to Li) was reached. This charge and discharge cycle was repeated 200 times.

Throughout the entire charge and discharge cycles, a rest time for about 10 minutes was allowed after each charge and discharge cycle.

Figure 3:
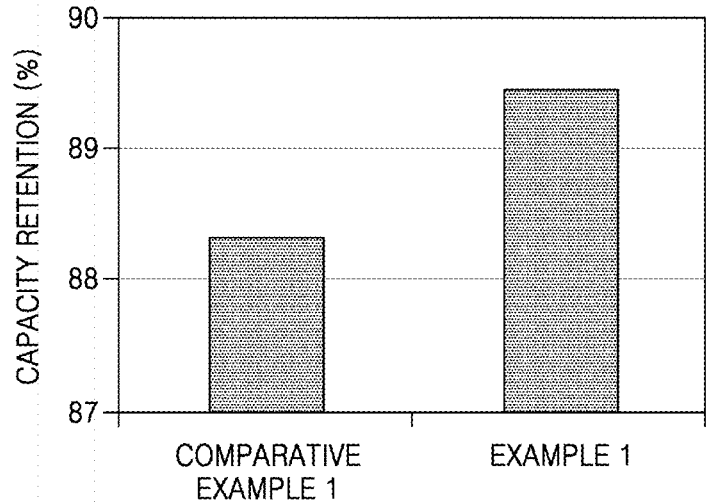
FIG. 3 is a graph of capacity retention at the 200$^{th}$ cycle for the lithium secondary batteries manufactured in Example 1 and Comparative Example 1.

The results of the charge and discharge test are shown in FIG. 3. A capacity retention at 200$^{th}$ cycle is defined by Equation 1.

Capacity retention (%)=[Discharge capacity at 200$^{th}$ cycle/Discharge capacity at 1$^{st}$ cycle]×100%  Equation 1

Referring to FIG. 3, the lithium secondary battery of Example 1 was found to have improved lifetime characteristics at room temperature, as compared with the lithium secondary battery of Comparative Example 1 that used the electrolyte of Comparative Preparation Example 1, which did not include a siloxane compound.

Evaluation of Gas Generation Amount After Charging/Discharging at 45° C.

Evaluation Example 4

The lithium secondary batteries of Examples 2 and 3 and Comparative Example 2 were each charged at 45° C. with a constant current of 0.1 C rate until a voltage of 4.3V (with respect to Li) was reached, and then with a constant voltage of 4.3V (constant voltage mode) with a cutoff current of 0.05 C rate, and subsequently discharged with a constant current of 0.1 C rate until a voltage of 2.8 V (with respect to Li) was reached (formation process, 1$^{st}$ cycle).

Each of the lithium secondary batteries after the 1$^{st}$ cycle of the formation process was charged at 45° C. with a constant current of 0.2 C rate until a voltage of 4.3 V (with respect to Li) was reached, and then with a constant voltage of 4.3V (constant voltage mode) with a cut-off current of 0.05 C rate, and subsequently discharged with a constant current of 0.2 C rate until a voltage of 2.8V (with respect to Li) was reached (formation process, 2$^{nd}$ cycle).

Each of the lithium secondary batteries after the 2$^{nd}$ cycle of formation process was charged at 45° C. with a constant current of 0.5 C rate until a voltage of 4.3V (with respect to Li) was reached, and then with a constant voltage of 4.3 V (constant voltage mode) with a cut-off current of 0.05 C rate, and subsequently discharged with a constant current of 1.0 C rate until a voltage of 2.8V (with respect to Li) was reached. This charge and discharge cycle was repeated 200 times.

Throughout the entire charge and discharge cycles, a rest time for about 10 minutes was allowed after each charge and discharge cycle.

Each of the lithium secondary batteries was put into a jig to measure a change in internal gas pressure, which was then converted into a volume and read as a gas generation amount. The evaluation results are shown in FIG. 4.

Figure 4:
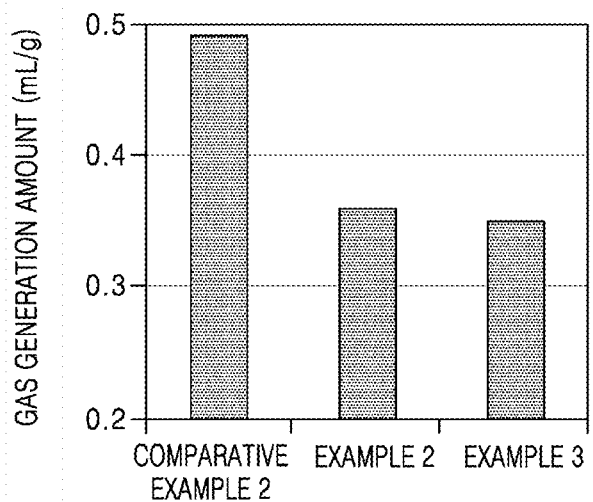
FIG. 4 is a graph showing the amount of gas generated after the 200$^{th}$ cycle for the lithium secondary batteries manufactured in Examples 2 and 3 and Comparative Example 2.

Referring to FIG. 4, the lithium secondary batteries of Examples 2 and 3 each using the electrolyte according to an embodiment were found to have remarkably reduced gas generation amounts, as compared with the lithium secondary battery of Comparative Example 2 using the electrolyte not including a siloxane compound.

As described above, according to the disclosed embodiment, an electrolyte including a siloxane compound (at least one of the siloxane compounds of Formulae 1 and 2) may have improved impregnability into a thick electrode and may prevent a reduction in mobility of lithium ions during charging and discharging. Accordingly, a silicon secondary battery including the electrolyte may implement a high capacity with a thick electrode and at the same time may have improved rate properties and lifetime characteristics due to the suppression of side reactions.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. An electrolyte comprising:
a lithium salt;
an organic solvent; and
at least one siloxane compound represented by Formula 1 or Formula 2,
wherein an amount of the at least one siloxane compound is 0.05 weight percent to 20 weight percent, based on a total weight of the electrolyte Formula 1

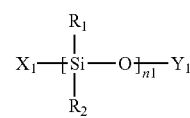

-continued

Formula 2

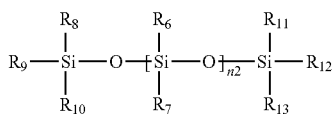

wherein, in Formulae 1 and 2,

X$_1$ is hydrogen, a hydroxyl group, or a substituted or unsubstituted C$_1$-C$_{10}$ alkyl group, Y$_1$ is hydrogen or —Si(R$_3$)(R$_4$)(R$_5$), n1 is an integer from 1 to 1000, n2 is an integer from 1 to 5, and R$_1$ to R$_{13}$ are each independently hydrogen, a substituted or unsubstituted C$_1$-C$_{10}$ alkyl group, a substituted or unsubstituted C$_6$-C$_{20}$ aryl group, or a polyalkylene oxide group represented by *—R$_{31}$—O—(RO)$_{m2}$—R$_{32}$, wherein R$_{31}$ is a substituted or unsubstituted C$_1$-C$_{10}$ alkylene group, and * represents a point of attachment to Si, RO is an alkylene oxide group, m2 is an integer from 1 to 20, and R$_{32}$ is hydrogen or a substituted or unsubstituted C$_1$-C$_{10}$ alkyl group, wherein, in Formula 1, X$_1$ is a hydroxyl group or Y$_1$ is hydrogen, and in Formula 2, at least one of R$_6$ to R$_{13}$ is the polyalkylene oxide group.

2. The electrolyte of claim 1, wherein the siloxane compound is of Formula 1 and is represented by Formula 1A:

Formula 1A

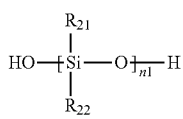

wherein, in Formula 1A, n1 is an integer from 1 to 1,000, and

R$_{21}$ and R$_{22}$ are each independently hydrogen or a substituted or unsubstituted C$_1$-C$_{10}$ alkyl group.

3. The electrolyte of claim 1, wherein the siloxane compound is of Formula 1 and is represented by Formula 1B:

Formula 1B

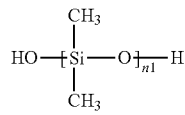

wherein, in Formula 1B, n1 is an integer from 1 to 1,000.

4. The electrolyte of claim 1, wherein the polyalkylene oxide group is a group represented by Formula 3:

Formula 3

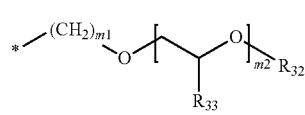

wherein, in Formula 3, m1 is an integer from 0 to 5, m2 is an integer from 1 to 20, and R$_{32}$ and R$_{33}$ are each independently hydrogen or a substituted or unsubstituted C$_1$-C$_{10}$ alkyl group.

5. The electrolyte of claim 4, wherein R$_{32}$ and R$_{33}$ are each independently hydrogen or a methyl group.

6. The electrolyte of claim 1, wherein the polyalkylene oxide group is a group represented by Formula 4:

Formula 4

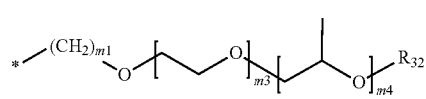

wherein, in Formula 4, m1 is an integer from 0 to 5, m3 and m4 are each independently an integer from 0 to 10, wherein the sum of m3 and m4 is 1 or greater, and R$_{32}$ is hydrogen or a methyl group.

7. The electrolyte of claim 1, wherein the siloxane compound is of Formula 2 and is represented by at least one of Formula 2A or 2B:

Formula 2A

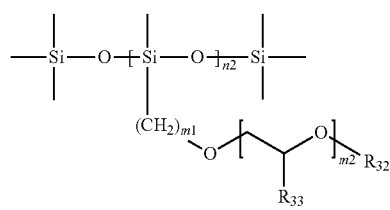

Formula 2B

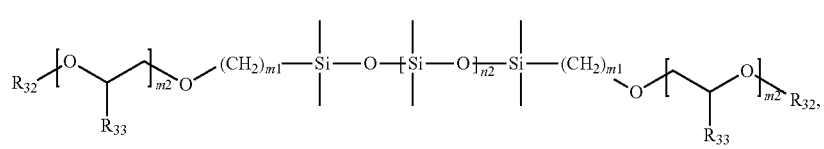

wherein, in Formulae 2A and 2B, each independently,
n2 is an integer from 1 to 5,
m1 is an integer from 0 to 5,
m2 is an integer from 1 to 20, and
$R_{32}$ and $R_{33}$ are each independently hydrogen or a methyl group.

8. The electrolyte of claim 7, wherein n2 is 1.

9. The electrolyte of claim 1, wherein the siloxane compound is of Formula 2 and is represented by at least one of Formulae 2C to 2I:

Formula 2C
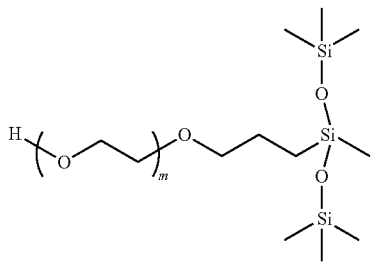

Formula 2D
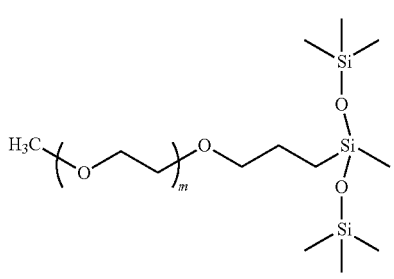

Formula 2E
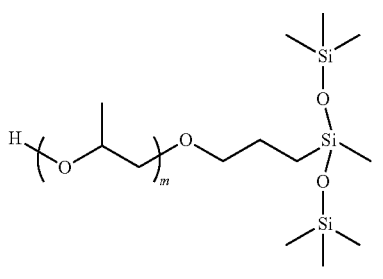

Formula 2F
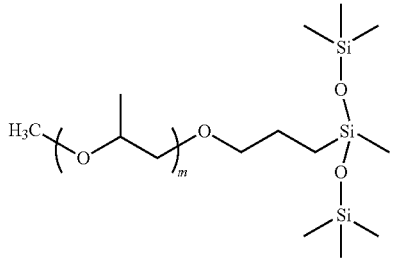

Formula 2G
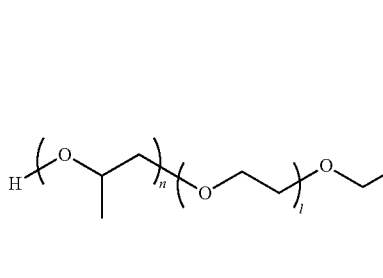

Formula 2H
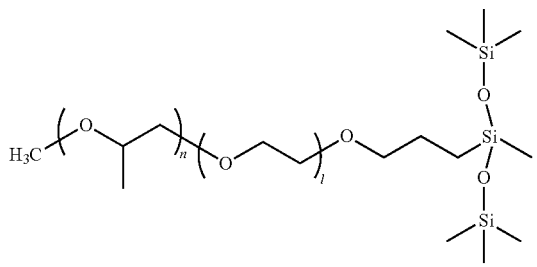

Formula 2I
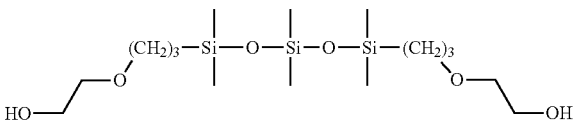

wherein, in Formulae 2C to 2I,
m is an integer from 1 to 10, and
n and l are each independently an integer from 1 to 10.

10. The electrolyte of claim 1, wherein the amount of the at least one siloxane compound is 0.05 weight percent to 10 weight percent, based on the total weight of the electrolyte.

11. The electrolyte of claim 1, wherein the siloxane compound represented by Formula 1 and the siloxane compound represented by Formula 2 each independently have a surface tension of 20 milliNewtons per meter to 27 milliNewtons per meter.

12. The electrolyte of claim 1, wherein the organic solvent comprises at least one of a carbonate solvent, an ester solvent, an ether solvent, or a ketone solvent.

13. The electrolyte of claim 1, wherein the organic solvent comprises at least one of ethylmethyl carbonate, methylpropyl carbonate, ethylpropyl carbonate, dimethyl carbonate, diethyl carbonate, dipropyl carbonate, propylene carbonate, ethylene carbonate, fluoroethylene carbonate, vinylene carbonate, vinylethylene carbonate, or butylene carbonate.

14. The electrolyte of claim 1, wherein the lithium salt comprises at least one of $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, or compounds represented by Formulae 22 to 25:

Formula 22
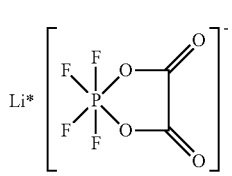

Formula 23

-continued

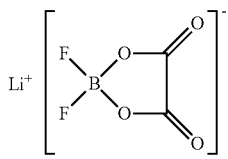

Formula 24

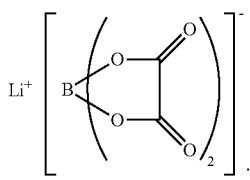

Formula 25

15. The electrolyte of claim 1, wherein a concentration of the lithium salt is 0.01 moles per liter to 5 moles per liter.

16. A lithium secondary battery comprising:
a cathode comprising a cathode active material;
an anode comprising an anode active material; and
the electrolyte according to claim 1 disposed between the cathode and the anode.

17. The lithium secondary battery of claim 16, wherein the cathode active material is a lithium-containing metal oxide.

18. The lithium secondary battery of claim 16, wherein the anode active material comprises at least one of a silicon compound, a carbonaceous material, a composite of a silicon compound and a carbonaceous compound, $SiO_x$, wherein $0<x<2$, lithium metal, or a metal alloyable with lithium.

19. The lithium secondary battery of claim 16, wherein the cathode and the anode each independently have a capacity per unit area of 4 milliampere-hours per square centimeter to 7 milliampere-hours per square centimeter.

20. The lithium secondary battery of claim 16, wherein the lithium secondary battery has a cell energy density per unit volume of 500 Watt-hours per liter to about 1,000 Watt-hours per liter.

* * * * *